United States Patent [19]
Abdelmalek

[11] Patent Number: 5,337,560
[45] Date of Patent: Aug. 16, 1994

[54] SHOCK ABSORBER AND A HERMETICALLY SEALED SCROLL GAS EXPANDER FOR A VEHICULAR GAS COMPRESSION AND EXPANSION POWER SYSTEM

[76] Inventor: Fawzy T. Abdelmalek, 12807 Willowyck Dr., St. Louis, Mo. 63146

[21] Appl. No.: 862,502

[22] Filed: Apr. 2, 1992

[51] Int. Cl.[5] .................................... F16D 31/02
[52] U.S. Cl. .................................... 60/370; 180/65.4; 290/1 A
[58] Field of Search ............... 60/668, 370, 371, 486; 180/302, 65.4, 305, 306; 290/1 A, 52

[56] References Cited

U.S. PATENT DOCUMENTS

| | | | |
|---|---|---|---|
| 3,666,038 | 5/1972 | Hudspeth et al. | 180/302 |
| 3,688,859 | 9/1972 | Hudspeth et al. | 180/302 |
| 3,980,152 | 9/1976 | Manor | 180/302 X |
| 4,185,465 | 1/1980 | Shaw | 290/52 X |

*Primary Examiner*—Stephen F. Husar
*Attorney, Agent, or Firm*—Veo Peoples, Jr.

[57] ABSTRACT

Energy of shock force normally absorbed by shock absorber in an automotor vehicle is recovered and converted to electric power.

2 Claims, 6 Drawing Sheets

SHOCK ABSORBER AND A HERMETICALLY SEALED SCROLL GAS EXPANDER FOR A VEHICULAR GAS COMPRESSION AND EXPANSION POWER SYSTEM

BACKGROUND OF THE INVENTION

1. Field of the Invention

The present invention relates generally to a method for converting the energy of road shock forces which normally damped by shock absorbers in a motor vehicle to produce useful electric power, more particularly relates to an improved shock absorber, and an actuator-generator unit employed to generate electric power from kinetic energy absorbed by the shock absorbers.

2. Description of the Prior Art

The continuing increases in the cost of fossil fuel, and the increased environmental concerns and regulations has forced global attention on variety of energy-conserving and energy-generating technologies previously were difficult to be economically justified. The major automotive manufacturers in the U.S.A. and Japan had set programs for developing new electric driven vehicles with higher efficiencies and improved electric batteries. Shock impact forces from road surface irregularities, vibration forces from unbalanced vehicle wheels, sudden accelerating, and vehicle braking forces are normally absorbed and damped by the shock absorbers. Vehicle size, body weight and desired level of riding comfort are factors which affect the selection of the shock absorbers type and design. A shock absorber dampens the oscillations of the vehicle's springs which do the actual work for absorbing road shocks. In front wheel drive cars, the shock absorber may be combined with the spring in a unit known as the frame strut. The shock absorber tames the spring, and assists in keeping the vehicle body from bouncing dramatically. Shocks usually wear or become weaker or softer, and may result in mushy ride that can affect tire wear and side to side handling. The shock absorber design and capacity may vary depending on the load, type of vehicle, road conditions, and type of driving. Shock absorbers usually deteriorate from wear to the seals that hold either the oil or gas fluid inside them. Replacing a shock absorber is usually as simple as bolt-off, bolt-on process, if the ride quality of the car or truck is poor, replacing the shock absorbers may be required. Coil springs usually provide support for the vehicle's weight, and are designed to position the vehicle's chassis height within a height range specified by the vehicle manufacturer.

U.S. Pat. No. 3,688,859 disclosed a vehicular gas compression system which includes a piston, and piston rod assembly reciprocated by a wheel suspension member of the vehicle for the transfer of a fluid to a pressure storage tank to operate a fluid motor downstream from the tank. U.S. Pat. No. 4,185,465 disclosed a hermetically helical screw expander-generator unit for use with evaporative power fluid in a closed power generation system. The present invention offers an improved gas shock absorber-compressor and a hermetically sealed scroll type gas expander apparatuses for use in combination with a vehicular vibration power generation system.

SUMMARY OF THE INVENTION

It is therefore a principle object of the present invention to provide an improved shock absorbing system, and to provide an apparatus for converting shock damping forces in a motor vehicle to drive an electric generator and to produce useful electric power.

It is further an object of the present invention to provide an improved pneumatic shock absorber to provide support to the vehicle load, dampen the road shocks, and pressurize a working fluid to circulate in a closed pneumatic power circuit.

It is further an object of the present invention to regulate and transmit auxiliary electric power produced by a D.C. electric generator to drive the components of the motor vehicle, or to store in an electric battery.

It is further an object of the present invention to conserve energy required to drive a motor vehicle by utilizing road shock damping forces to produce useful electric power.

It is further an object of the present invention to increase the cruising driving distance of a motor vehicle with no additional increase to its fuel tank or electric battery storage capacity.

It is further an object of the present invention to improve the environment by conserving energy, reducing the greenhouse effect, and reducing motor vehicles emissions.

The above and other objects and advantages of the present invention will become apparent from the following specifications, drawings, and claims. It will be understood that particular embodiments of the invention are shown by way of illustration only and not as limitation of the invention. The principle features of the invention may be employed in various embodiments without departing from the scope of the invention.

DETAILED DESCRIPTION OF THE PRESENT INVENTION

In a motor vehicle, a shock absorber is used to dampen the forces of the road shocks, and to control the car load from bouncing dramatically. The energy absorbed is normally dissipated in the form of heat into the surrounding.

The kinetic energy of the sudden vertical movement of the wheel under a shock force is mostly absorbed by the coil spring which provides most of the work to absorb the shock force. The shock absorber mates with the spring to provide resistance to the shock force, and to prevent the car body from sudden bouncing back. When the shock is absorbed, the coil spring expands back slowly while being restrained and controlled by the mating shock absorber. The absorber fluid bleeds through a number of orifices at a desired flow rate to provide controlled resisting force against the spring expansion force.

The present invention offers an improvement to utilize the shock energy to pressurize a working fluid into a relatively high pressure accumulator in a closed circuit with an actuator-electric power generating device. The actuator may be of a reciprocating or rotary type. The estimated electric power generated by the invented system shall vary depending on the road conditions, driving speed, car load, driving style . . . etc. The electric power generated can be used to drive the electric components of the motor vehicle that normally consumes energy from the electric, gasoline, or diesel fueled engine. The radiator fan, the air conditioner compressor unit, the cabinet fan, the electric lighting system, and many other electric and electronic devices, accessories, and controls may be operated by the electric energy generated by the invented system.

In case of an electric driven vehicle, the power generated by the invented system can be used to reduce the draw down rate of the electric battery, thus increasing the cruising distance of the vehicle while using the same initial battery charge.

OPERATION

Figure 1A:
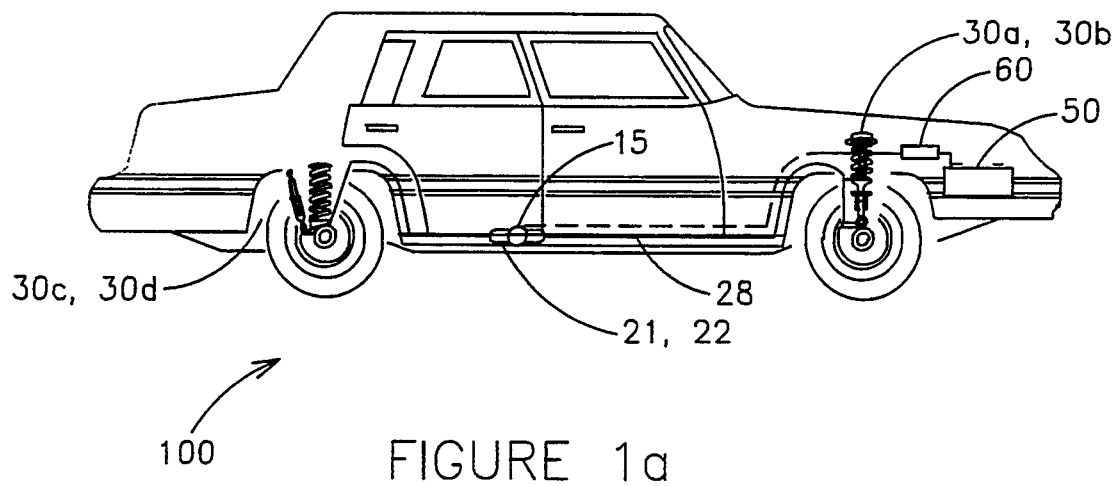
FIG. 1a. is a drawing indicating an arrangement of a motor vehicle with the invented shock absorber system.

In FIG. 1a. a view of a motor vehicle 100 having front gas filled strut type shock absorbers 30a, 30b, and rear cartridge type shock absorbers 30c and 30d having separate coil springs. The shock absorbers are connected by a closed circuit 28 to a high pressure accumulator 21, a pressure control valve 22, and a gas expander- generator unit 15 installed and supported from under the motor vehicle frame. When the motor vehicle is driven, the shock absorbers pressurize the working fluid simultaneously in circuit 28 to a relatively high pressure accumulator 21, the pressure control valve 22 maintains a working pressure range in the accumulator 21, and releases relatively high pressure gas to actuate an expander-generator unit 15. The electric power generated is transmitted to the electric battery 60 through a current and voltage regulator device 50. The relatively low pressure gas flowing from the expander-generator unit is conducted back to the shock absorbers intakes.

Figure 1B:
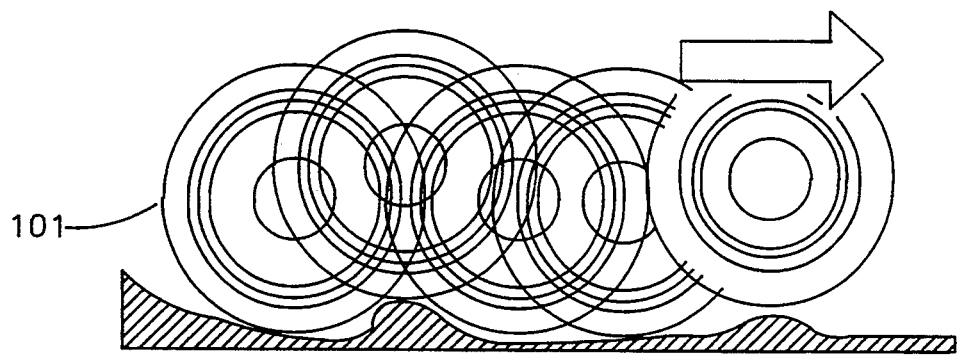
FIG. 1b. is a drawing indicating the effect of the road shock on the wheel and the shock absorber.

FIG. 1b. indicates a schematic view of the motor vehicle's wheel 101 while rolling over a rough road surface, the wheel moves up by the force of the shock and simoultanously is pushed back by the shock absorber to stay in contact with the road surface.

Figure 1C:
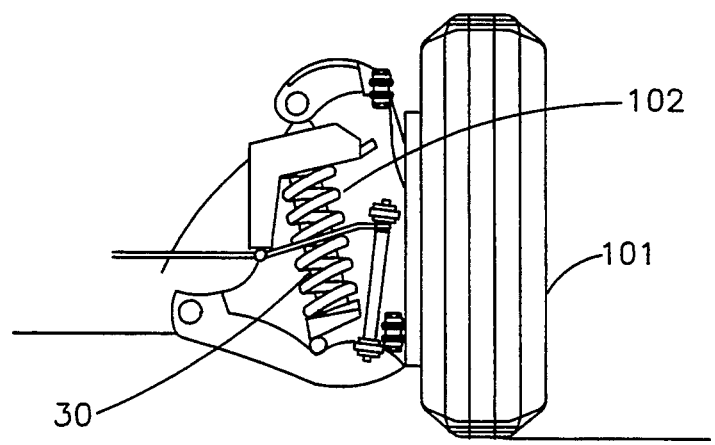
FIG. 1c. is a drawing indicating an arrangement of a shock absorber and support spring.

FIG. 1c. indicates a view of the vehicle suspension, the sudden shock force pushes the wheel 101 to move upward while the support spring 102 and the shock absorber unit 30 react instantly to keep the wheel in contact with the road surface and to dampen its vibrations. The shock absorber responds to keep the car load from bouncing dramatically, and pressurize the working fluid to a relatively high pressure in the accumulator. The high pressure gas act as a pneumatic spring and absorb the sudden shock force. When the wheel 101 moves upwardly by a sudden shock force, the spring 102 is compressed, and the piston rod of the shock absorber 30 responds instantly by moving downwardly. After the shock force is damped, the spring 102 expands slowly while being restrained by the damping piston of the shock absorber 30 to prevent the car frame member 103 from bouncing dramatically. The damping movement of the piston of the shock absorber is controlled by restricting the flow of the working fluid contained in a damping chamber to provide the required ride comfort level. The frame coil spring 102 is designed to mate with the shock absorber 30, to provide support, and to absorb the dynamic energy through pressurizing the working fluid into a relatively high pressure accumulator (not shown).

Figure 2:
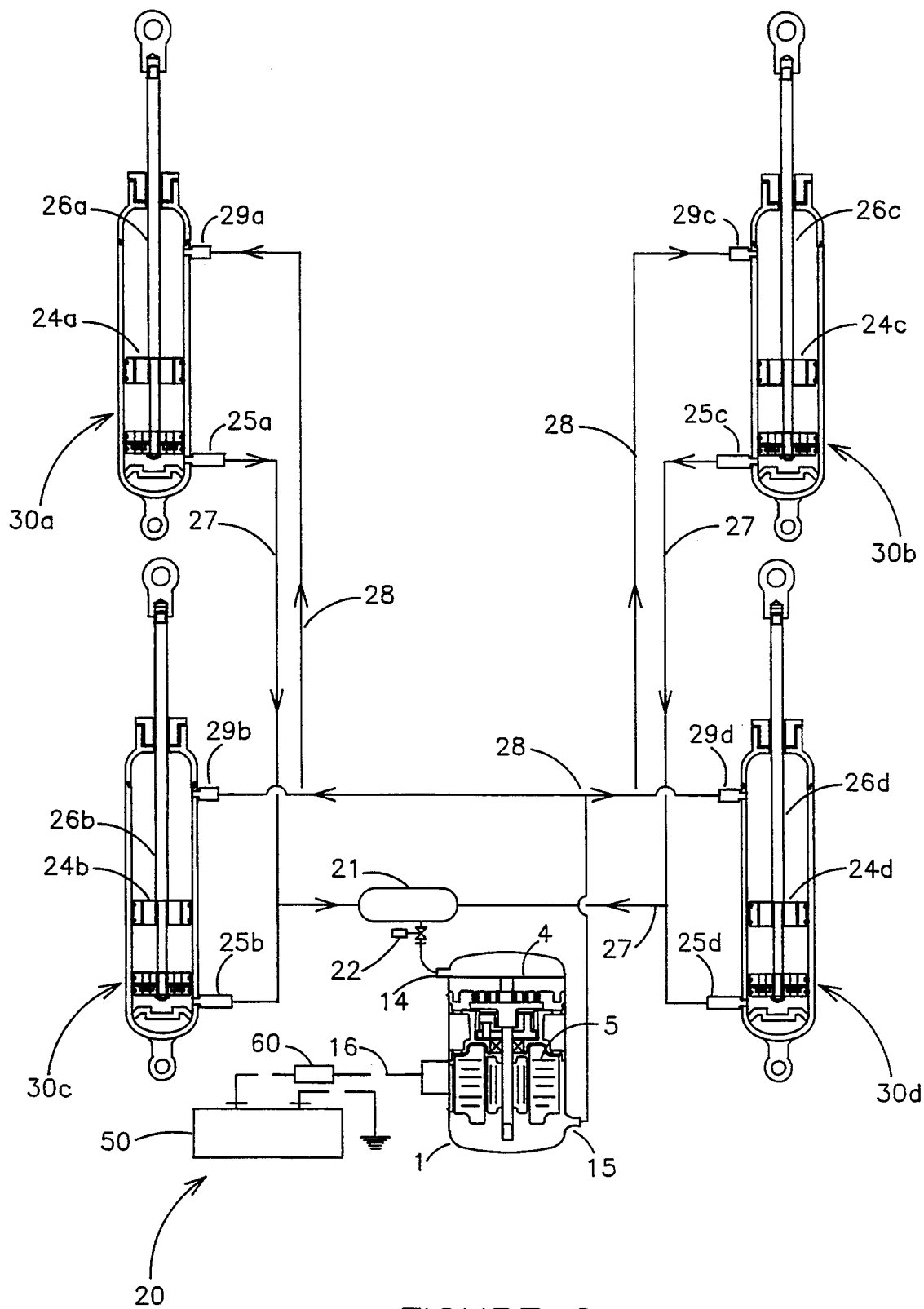
FIG. 2. is a schematic diagram indicating a gas pressurized shock absorber and power actuator-generator system.
Figure 4:
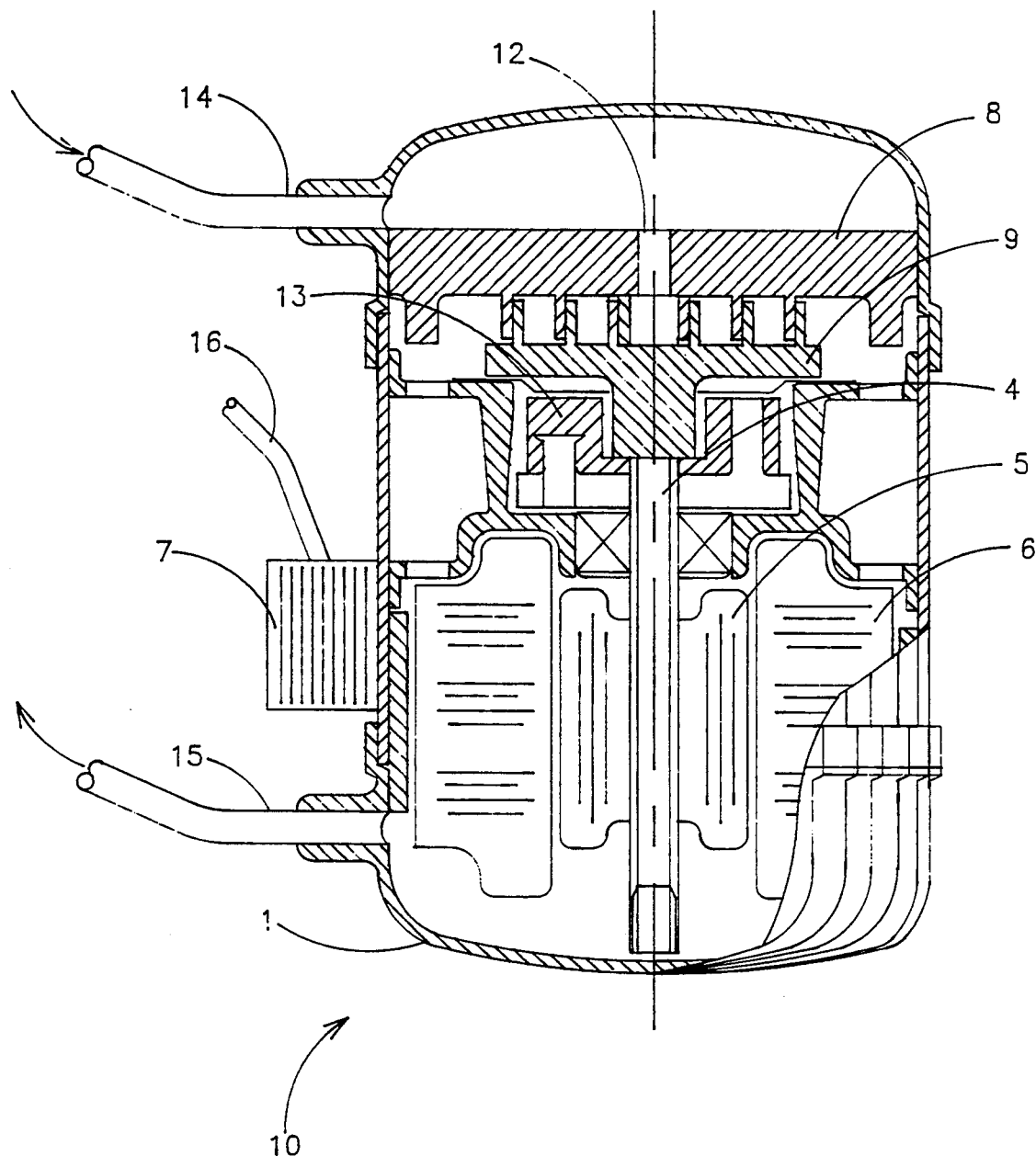
FIG. 4. is a sectional view for a hermetically sealed scroll gas expander- D.C. electric generator unit.
Figure 5:
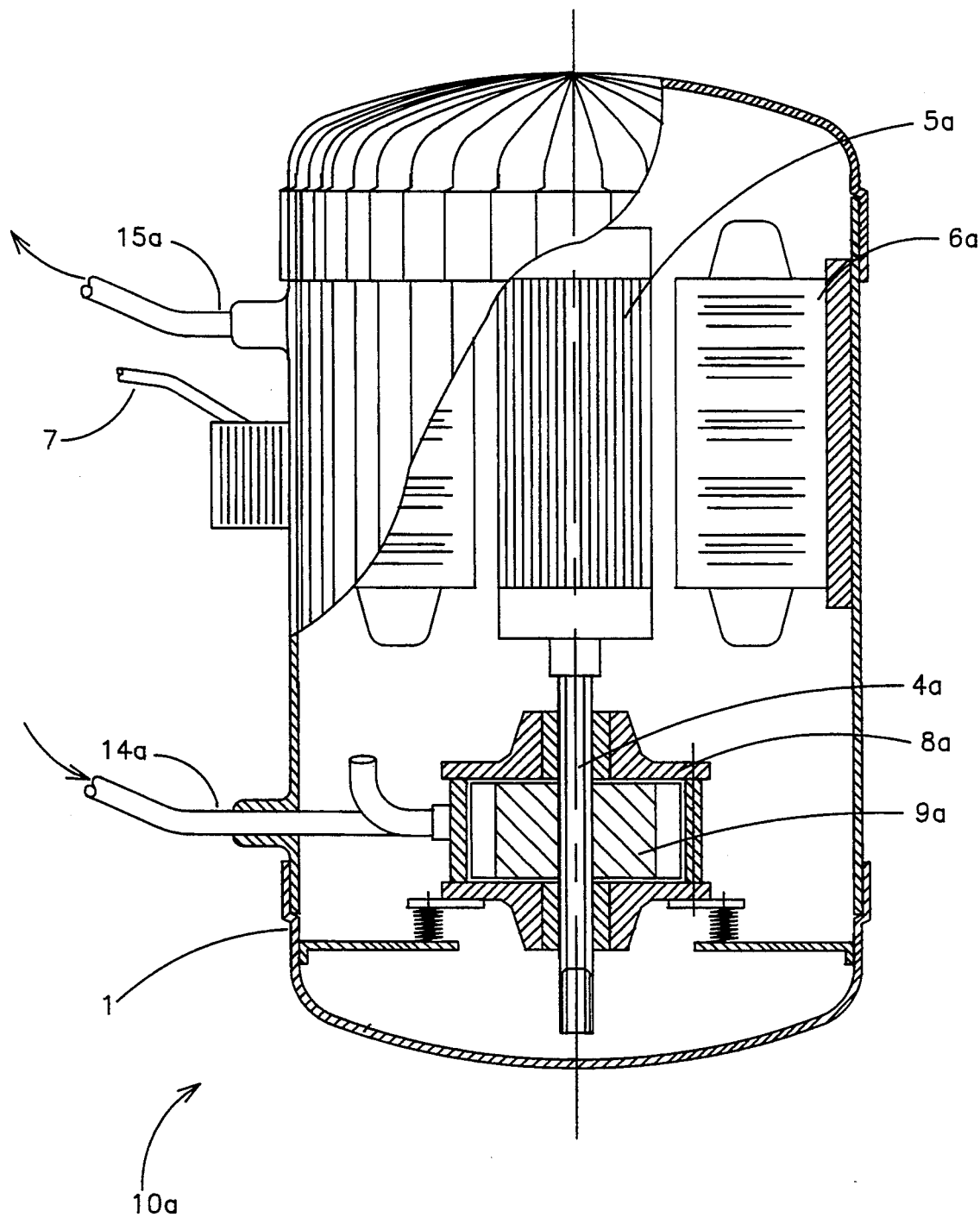
FIG. 5. is a sectional view for a hermetically sealed sliding vane rotary gas expander- D.C. electric generator unit.

FIG. 2 indicates a system 20 has a hermetically sealed expander-generator unit similar to the embodiments indicated in FIGS. 4 and 5. The enclosure of the expander-generator unit contains expander mechanism 4, a D.C. generator assembly 5, and has a relatively higher pressure inlet 14 and a relatively lower pressure discharge outlet 15 connected to the vehicle shock absorber in a closed circuit. A relatively higher pressure gas is released from the gas accumulator 21 through a pressure control valve 22 into the expander inlet 14, the gas expands through the hemetically sealed expander, actuates the impeller shaft assembly and drives the rotor of the electric generator. The relatively lower pressure gas exits the expander through outlet 15 and then is conducted back to the intake connection of the shock absorbers 30a, 30b, 30c, and 30d. A relatively high pressure conduit 27 interconnects the expander inlet 14 to communicate with pressure control valve 22, pressure accumulator 21 and the one way high pressure discharge connections 25a, 25b, 25c, and 26d of the shock absorbers. A relatively lower pressure conduit 28 interconnects the expander outlet 15 to communicate with the one way low pressure intakes 29a, 29b, 29c, and 29d of the shock absorbers. The output of the direct electric current generator is transmitted to the vehicle electric battery 50 by an electric wire cable 16, and a voltage regulator controller 60. Pressure control valve 22 is adjusted to release the relatively high pressure gas to drive the actuator upon reaching the desired differential pressure between discharge and return gas pressures.

Figure 3A:
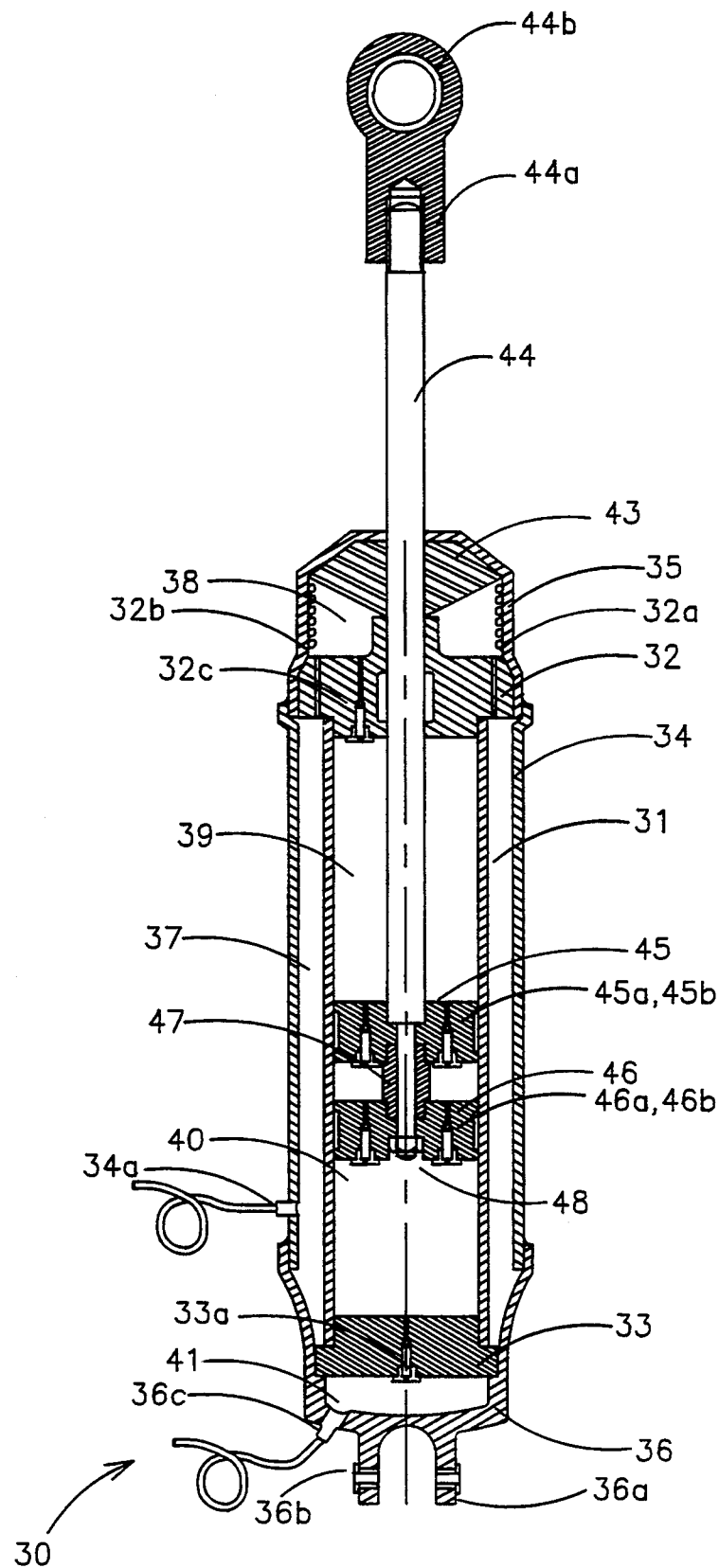
FIG. 3a. is a longitudinal sectional view for a cartridge type shock absorber.

FIG. 3a. is a fragmentary longitudinal section of a preferred construction of a cartridge type shock absorber assembly for use in a motor vehicle with a separate load support coil spring (not shown). The invented shock absorber assembly 30 has an inner tube containing a piston rod assembly, and surrounded by a hermetically sealed outer enclosure. The inner tube assembly 31 having a precision finished interior surface threaded at both ends. An upper cap like portion 32 is screwed into the upper threaded end of the tube 31, and a lower cap like portion 33 is screwed into the threaded lower end of the tube 31. The hermetically sealed outer enclosure assembly preferably of welded construction, consists of a tube 34, an upper cap like portion 35, and a lower cap like portion 36. The inner tube 31, and the outer tube 34 form an annular space 37 connected to an upper space 38 through multiple hole passages 32a, 32b in the cap like portion 32. The cap like portion 32 has a one way flow valve 32c which permits one direction flow of the working gas from the upper chamber space 38 to the inner tube damper chamber space 39. The lower cap like portion 33 has a one way flow valve 33a which permits the flow of the working gas from the inner tube compression chamber space 40 to a discharge chamber space 41. The piston rod assembly is disposed inside the inner tube 31, its rod extends outside the outer tube assembly through a spring loaded compression type gas leak proof seal 43 contained in the upper cap enclosure 35. The piston rod assembly consists of a precision machined rod 44 having a connecting part 44a to be connected to the vehicle frame (not shown), and connected at the other end to the piston assembly. The piston assembly consists of a precision machined parts and has a damper piston part 45, and a compression piston part 46 connected together with a threaded spacer ring 47. The damper piston 45 and the compression piston 46 have multiple orifices, and one way multiple stage flow control valves 45a, 45b, 46a, and 46b. The one way multiple stage flow control valves provide the damping effect through restricting the flow from the damper space 39 to the compression space 40, and prevent reverse flow of the working gas from the compression chamber space 40 to the damper space 39. The piston assembly is mounted on the piston rod and retained by a locking nut 48. The piston rod connecting part 44a includes vibration isolation snug rubber washer 44b, similarly the lower cap like part of the hermetically sealed enclosure has connecting means 36a which includes vibration isolation snug rubber washers 36b. A gas inlet pipe 34a and gas outlet pipe 36c are attached to the hermetically sealed outer enclosure assembly. When the vehicle is in operation, and under the effect of a road shock, the frame support helical spring (not shown) is compressed, and the piston rod undergoes downward movement, pressurize the gas contained in the compression chamber space 40, and force it through the one way valve 33a into the relatively high pressure chamber space 41, then into the pipe connection 36c to flow into the gas pressure reservoir (not shown). The pressurized gas is prevented from back flow by the one way valve 33a, and resists the piston movement downwardly, providing a gas spring effect. The movement of the piston downwardly causes a pressure drop in the damper chamber space 39, subsequently a relatively higher pressure gas is drawn from the inlet tube 34a to the annular space 37, then through the communicating holes 32a and 32b to enter the upper chamber space 38, the gas is then flow through the one way flow valve 32c to enter the damper chamber space 39. When the frame support coil spring (not shown) extends by its own force to restore the vehicle frame position, it is restrained by the shock absorber by restricting the flow of the gas from damper chamber space 39 to the compression chamber space 40, resulting in a relatively slow restoration, and preventing bouncing of the connected vehicle load.

Figure 3B:
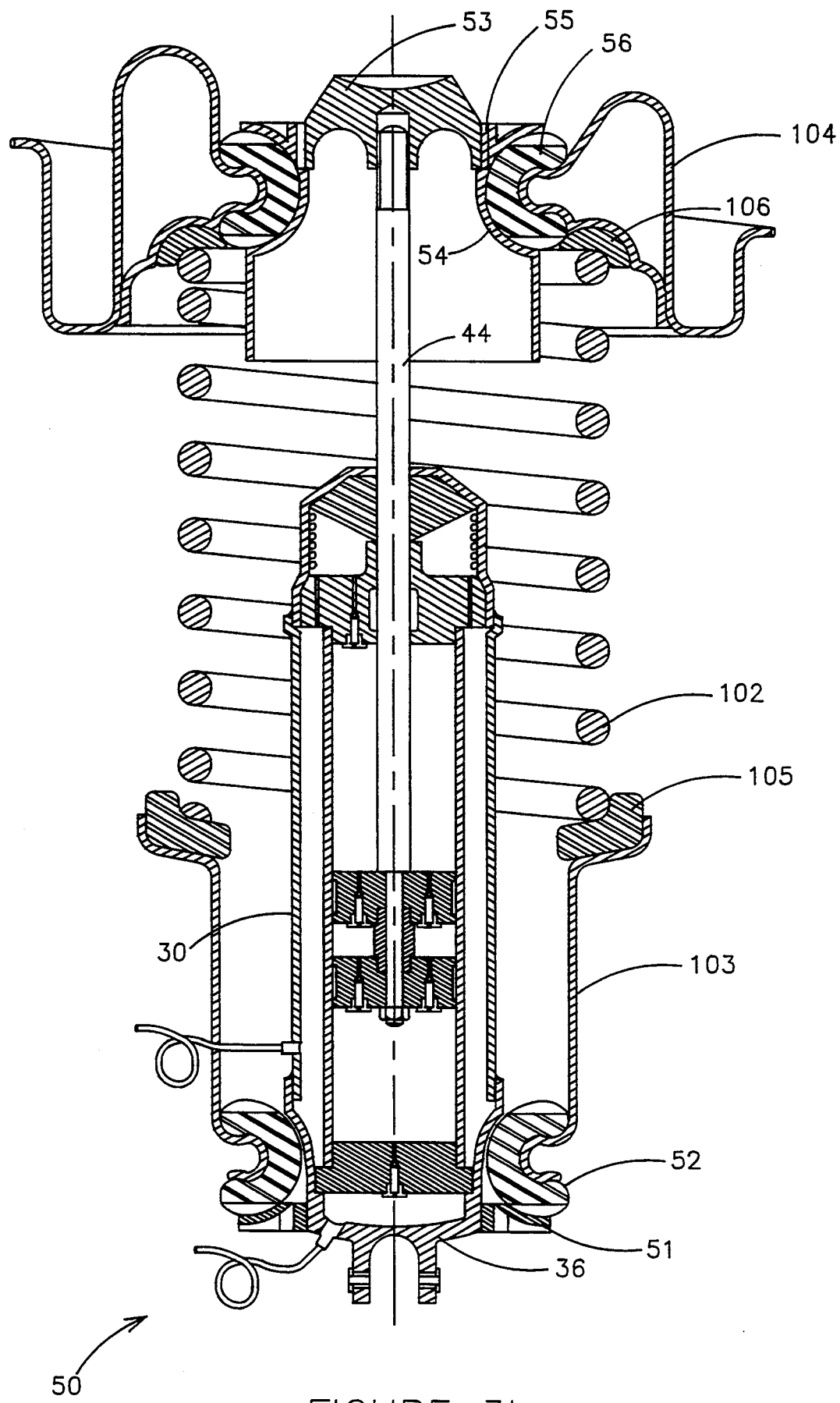
FIG. 3b. is a longitudinal sectional view of a strut type shock absorber.

FIG. 3b. is a fragmentary longitudinal section of another embodiment for a strut type shock absorber 50 for use in a motor vehicle using the same basic construction of the cartridge type shock absorber assembly indicated in FIG. 3a. The cartridge shock absorber assembly 30 is mounted in a special arrangement to permit installation of the support coil spring 102, and to provide the connections to the vehicle frame and the wheel axel. The indicated spring mounting arrangement is generally similar in construction to that disclosed in U.S. Pat. No. 3,554,524 by Wilhelm Riehl. A threaded flange 51 is screwed on the cap shaped portion 36 constituting a securing means for a rubber ring 52, which is arranged between the cap like portion 36, and a part of the vehicle body 103 which forms an abutment for a lower rubber ring 105 which supports a helical spring 102 concentrically surrounding the shock absorber assembly. At the other end, the piston rod 44 is connected to a cap shaped portion 53, which is screwed to an annular portion 54. Similarly a threaded flange 55 is screwed to the top of the annular portion 54 constituting a securing means for rubber ring 56 which is arranged between the annular portion 54, and a part connected to a part of the vehicle body 104 which forms a seat for an upper rubber ring 106 to support the spring 102.

FIG. 4. indicates a sectional view of hermetically sealed scroll type expander-generator unit 10, employed with the present invention. The hermetically sealed scroll expander mechanism drives a permanent magnet D.C. generator, having a drive shaft assembly 4, a rotor assembly 5, a stator assembly 6, and an external electrical connection box 7. The actuator mechanism consists of a stationary spiral assembly 8, an orbiting spiral assembly 9, high pressure gas intake 12, and low pressure discharge 11. When the high pressure gas expands through the stationary spiral 8, the orbiting spiral 9 moves freely against the inside surface of the stationary spiral 8, they form sealed pockets which undergo continuous increase in volume and consequently a decrease in gas pressure starting at the high pressure chamber of the expander inlet 12, and ending at the low pressure chamber at the expander discharge 11. The orbiting spiral 9 is connected by an orbital drive assembly 13 which pivots on the generator drive shaft 4 forcing the generator rotor 5 to turn. The assembly is retained and secured against the inside surface in a hermetically sealed enclosure 1. The relatively higher pressure gas inlet conduit 14, the relatively lower pressure gas discharge conduit 15, and the electric power wiring 16 are hermetically connected to the enclosure. The scroll expander can be manufactured from the already designed, developed, and manufactured parts and assemblies of the well known scroll type compressor presently used in the direct expansion air conditioning and refrigeration systems.

FIG. 5. indicates a sectional view of a hemetically sealed sliding vane type expander-generator unit 10a employed with the present invention. The hermetically sealed rotary gas expander-generator consists of a hermetically sealed enclosure 1a which contains a sliding vane rotary actuator, and a permanent magnet D.C. generator having a common drive shaft assembly 4a, a rotor assembly 5a, a stator assembly 6a, and an external electric connection box 7a. The expander assembly consists of a rotor assembly 9 having extending slidable vanes, when the drive shaft 4 rotates by the expanding working gas, the vanes slide by the effect of the centrifugal force and press outwardly against the inside surface of the housing 8a to form sealed compartments which undergo a continuous increase in volume and subsequently a decrease in the gas pressure starting from the high pressure chamber at the expander inlet 14a, and ending at the low pressure chamber at the expander discharge 15a. The sliding vanes are preferably spring loaded to keep contact seal with the housing surface to reduce leakage, and are guided in their inward and outward movement.

The rotary sliding vane expander generator assembly can be assembled from the already designed, developed and manufactured parts used for the rotary sliding vane compressors and air motor drives.

The expander inlet is directly connected to the outside of the hermetic sealed enclosure. The expanded gas is allowed to flow through the generator for cooling its winding before returning back to the shock absorber inlet.

For purposes of simplicity the schematic drawings do not indicate the well known prior art for the expander lubricating, oil filtering, and oil separating devices.

Although the invented shock absorber and the hermetically sealed power expander-generator units are described herein in terms of the specified embodiments set forth in detail, it should be understood to those who are skilled in the art that the invention is not necessary limited thereto, since alternative embodiments and other operating fluids for converting potential energy to kinetic energy maybe employed, accordingly; modifications for other arrangements of the components are contemplated, and obviously can be made without departing from the spirit of the described invention.

What is claimed:

1. A shock absorber apparatus, in combination with an electric motor driver vehicle, which vehicle contains a pressurized working gas fluid within a closed circuit to drive a hermetically sealed gas expander-electric generator, which generator provides direct electric current to a battery, said shock absorber apparatus being a high pressure gas shock absorber-compressor for dampening vertical movements of said vehicle's suspension while pressurizing the working gas fluid and comprising:

an inner cylinder assembly mounted inside a hermetically sealed enclosure to form an annular intake space;

a piston rod assembly having one end connected to the motor driven vehicle frame, and the other end connected to a movable compression-dampening piston assembly disposed inside said inner cylinder; said compression-dampening piston assembly and said inner cylinder forming a damping chamber space and a compression chamber space; and multi-stage flow control check valves fitted in the said dampening piston to produce variable damping effect, and to allow one way flow from the said dampening chamber space to said compression space; and a check valve fitted in an inlet port to said hermetically sealed enclosure to allow one way flow of the said gas fluid returning from the gas expander-electric generator to the said annular intake space;

a passage way to allow flow of the said gas fluid from the said annular intake space to the said inner cylinder dampening cheer space upon downwardly movement of the said piston rod assembly; and a check valve fitted in the said compression piston assembly to allow one way flow of the said gas fluid from the said dampening chamber space to the said compression chamber space upon an upwardly movement of the said piston rod assembly, and to prevent a reverse flow upon change in the direction of the piston movement upwardly; and a check valve fitted on an outlet of the said inner cylinder to allow a one way flow of the said pressurized gas fluid from the said compression chamber to the gas expander-electric generator; and a retaining means secured to the shock absorber to support a suspension coil spring which restores the said vehicle's frame to its normal rest position.

2. The combination of claim 1 wherein the hermetically sealed gas expander-electric generator comprises a hermetically sealed scroll orbiting type gas expander-generator apparatus having:

a heretically sealed enclosure manufactured from a welded steel plate enclosing a gas expanding-generator assembly, said hermetically sealed enclosure is characterized to have a lubricating oil reservoir, resilient support means, a relatively high pressure gas inlet connection, a relatively low pressure gas outlet connection, and electric terminal connections;

a stationary spiral casing assembly manufactured from cast steel or welded steel plate is disposed inside said hermetically sealed enclosure, said stationary spiral casing assembly has a relatively high pressure gas intake port located at its center and has a relatively low pressure gas exhaust port located at the end of its most outer spiral;

an orbiting spiral impeller assembly manufactured from cast steel or welded steel plate which can orbit freely inside the said stationary spiral casing under the effect of the expansion of a working gas fluid from a relatively high pressure level to a relatively low pressure level;

an eccentric connecting rod mechanism connected to the said orbiting spiral assembly to convert the said orbiting motion to a rotary motion;

a power shaft connected to the said eccentric connecting rod mechanism, said power shaft extends into a lubricating oil reservoir located at the base of the said enclosure to provide lubricating oil to the said orbiting impeller;

a permanent magnet brushless direct current generator assembly having a rotor mounted on the said power shaft, said generator is characterized to have means for electronic commutation with electronic switching.

* * * * *